United States Patent
Nader et al.

(10) Patent No.: US 11,570,671 B2
(45) Date of Patent: *Jan. 31, 2023

(54) NB-IOT DEVICE PERFORMING NEIGHBORING LINK MEASUREMENT DESPITE REFRAINING CONDITION

(71) Applicant: Telefonaktiebolaget LM Ericsson (publ), Stockholm (SE)

(72) Inventors: Ali Nader, Malmö (SE); Martin Van Der Zee, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/225,451

(22) Filed: Apr. 8, 2021

(65) Prior Publication Data
US 2021/0227434 A1 Jul. 22, 2021

Related U.S. Application Data

(63) Continuation of application No. 16/604,299, filed as application No. PCT/EP2018/057070 on Mar. 20, 2018, now Pat. No. 11,006,334.

(Continued)

(51) Int. Cl.
*H04W 36/00* (2009.01)
*H04W 52/02* (2009.01)
(Continued)

(52) U.S. Cl.
CPC ...... *H04W 36/0094* (2013.01); *H04B 17/309* (2015.01); *H04W 4/70* (2018.02);
(Continued)

(58) Field of Classification Search
None
See application file for complete search history.

(56) References Cited

U.S. PATENT DOCUMENTS

| 2010/0041412 A1* | 2/2010 | Yu | H04W 24/10 |
| | | | 455/450 |
| 2011/0292812 A1* | 12/2011 | Kim | H04W 52/34 |
| | | | 370/242 |

(Continued)

FOREIGN PATENT DOCUMENTS

| CN | 111290315 A | 6/2020 |
| GB | 2540806 A | 2/2017 |
| WO | 2013051866 A1 | 4/2013 |

OTHER PUBLICATIONS

CMCC, "Cell reselection issue for NB-IoT", 3GPP TSG-RAN WG2 Meeting #97, Athens, Greece, Feb. 13, 2017, pp. 1-2, R2-1702929, 3GPP.

(Continued)

*Primary Examiner* — Kenny S Lin
(74) *Attorney, Agent, or Firm* — Coats & Bennett, PLLC

(57) ABSTRACT

A user equipment (UE) in a wireless communication network determines a snapshot value of a serving link signal received quality while the UE is permitted to refrain from performing neighbor link measurements. Responsive to detecting, while the UE is permitted to refrain from performing neighbor link measurements, that signal received quality of a serving link has dropped by at least a threshold amount below the snapshot value, the UE performs a neighbor link measurement.

19 Claims, 10 Drawing Sheets

DETECTING FULFILLMENT OF A CONDITION UNDER WHICH THE UE IS PERMITTED TO REFRAIN FROM PERFORMING NEIGHBOR LINK MEASUREMENTS
102

RESPONSIVE TO DETECTING THAT SIGNAL QUALITY OF A SERVING LINK HAS DROPPED BY AT LEAST A THRESHOLD AMOUNT SINCE DETECTING THE FULFILLMENT OF THE CONDITION, PERFORMING NEIGHBOR LINK MEASUREMENTS
104

Related U.S. Application Data

(60) Provisional application No. 62/485,808, filed on Apr. 14, 2017.

(51) Int. Cl.
*H04W 4/70* (2018.01)
*H04B 17/309* (2015.01)
*H04W 36/08* (2009.01)
*H04W 36/30* (2009.01)

(52) U.S. Cl.
CPC . *H04W 36/0088* (2013.01); *H04W 36/00835* (2018.08); *H04W 36/08* (2013.01); *H04W 36/30* (2013.01); *H04W 52/0216* (2013.01); *H04W 52/0219* (2013.01); *H04W 52/0241* (2013.01); *H04W 52/0245* (2013.01)

(56) References Cited

U.S. PATENT DOCUMENTS

| | | | |
|---|---|---|---|
| 2012/0201158 A1 | 8/2012 | Geirhofer et al. | |
| 2013/0188499 A1 | 7/2013 | Mach et al. | |
| 2016/0302098 A1* | 10/2016 | Gheorghiu | H04W 72/085 |
| 2016/0316385 A1* | 10/2016 | Larsson | H04W 24/08 |
| 2017/0311217 A1* | 10/2017 | Jung | H04W 36/30 |
| 2019/0364451 A1* | 11/2019 | Yang | H04W 24/10 |
| 2020/0053608 A1* | 2/2020 | Tao | H04B 7/0617 |
| 2020/0166922 A1 | 5/2020 | Cella et al. | |

OTHER PUBLICATIONS

Ericsson (Email Rapporteur), "Email report [97bis#31][NB-IoT] Cell reselection for NB-IoT", 3GPP TSG-RAN2 Meeting #98, Hangzhou, China, May 15, 2017, pp. 1-17, R2-1705031, 3GPP.

Vice-Chairman (CMCC), "Report from LTE Break-Out session (eVoLTE, Mobility enh, feMBMS, UDC)", Document for approval, 3GPP TSG RAN WG2 #97bis, Spokane, USA, Apr. 3, 2017, pp. 1-5, R2-170xxxx, 3GPP.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 14)", Technical Specification, 3GPP TS 36.304 V14.2.0, May 1, 2017, pp. 1-49, 3GPP, France.

3rd Generation Partnership Project, "3rd Generation Partnership Project; Technical Specification Group Radio Access Network; Evolved Universal Terrestrial Radio Access (E-UTRA); User Equipment (UE) radio access capabilities (Release 15)", Technical Specification, 3GPP TS 36.306 V15.6.0, Sep. 1, 2019, pp. 1-117, 3GPP, France.

Ericsson, "Further simulations on network based solutions for coverage optimization", 3GPP TSG-RAN WG2 #68, Jeju, Korea, Nov. 9, 2009, pp. 1-10, R2-096737, 3GPP.

3rd Generation Partnership Project, "3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 14)", Technical Specification, 3GPP TS 36.523-1 V14.0.0, Mar. 1, 2017, pp. 1-593, 3GPP, France.

Mediatek Inc., "Draft Report from the IoT breakout sessions", 3GPP TSG-RAN WG2 Meeting #97bis, Spokane, USA, Apr. 3, 2017, pp. 1-23, Draft R2-170xyxy, 3GPP.

CMCC, "Cell reselection issue regarding to NB-IoT", 3GPP TSG-RAN WG2 Meeting #97, Athens, Greece, Feb. 13, 2017, pp. 1-2, R2-1702929, 3GPP.

* cited by examiner

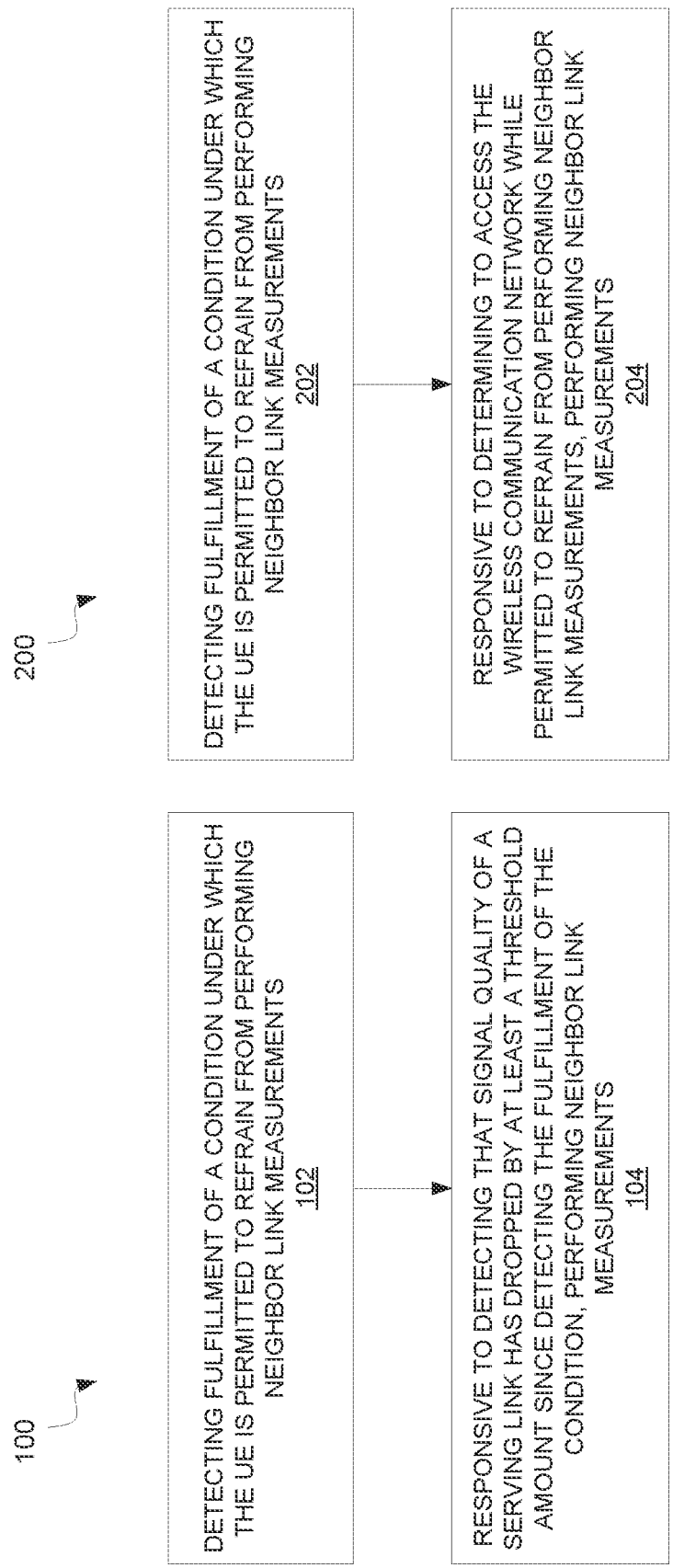

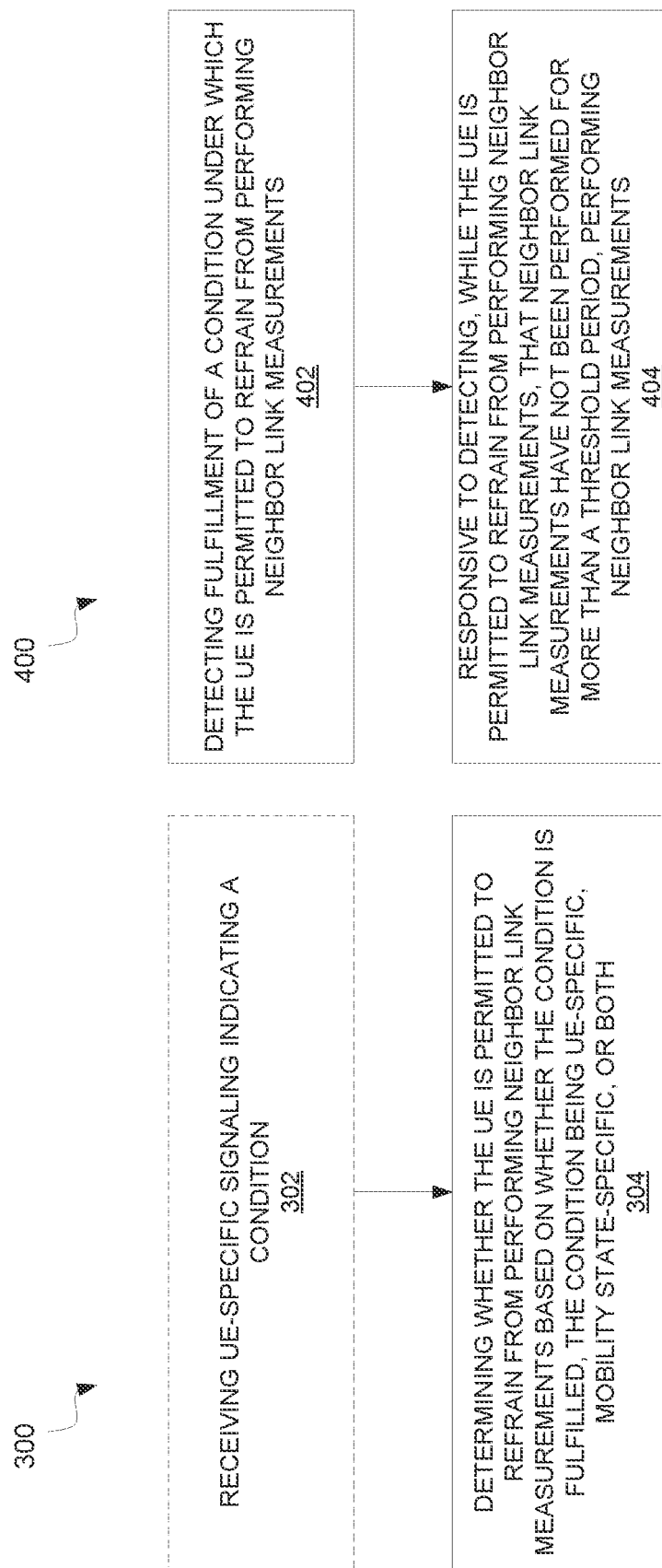

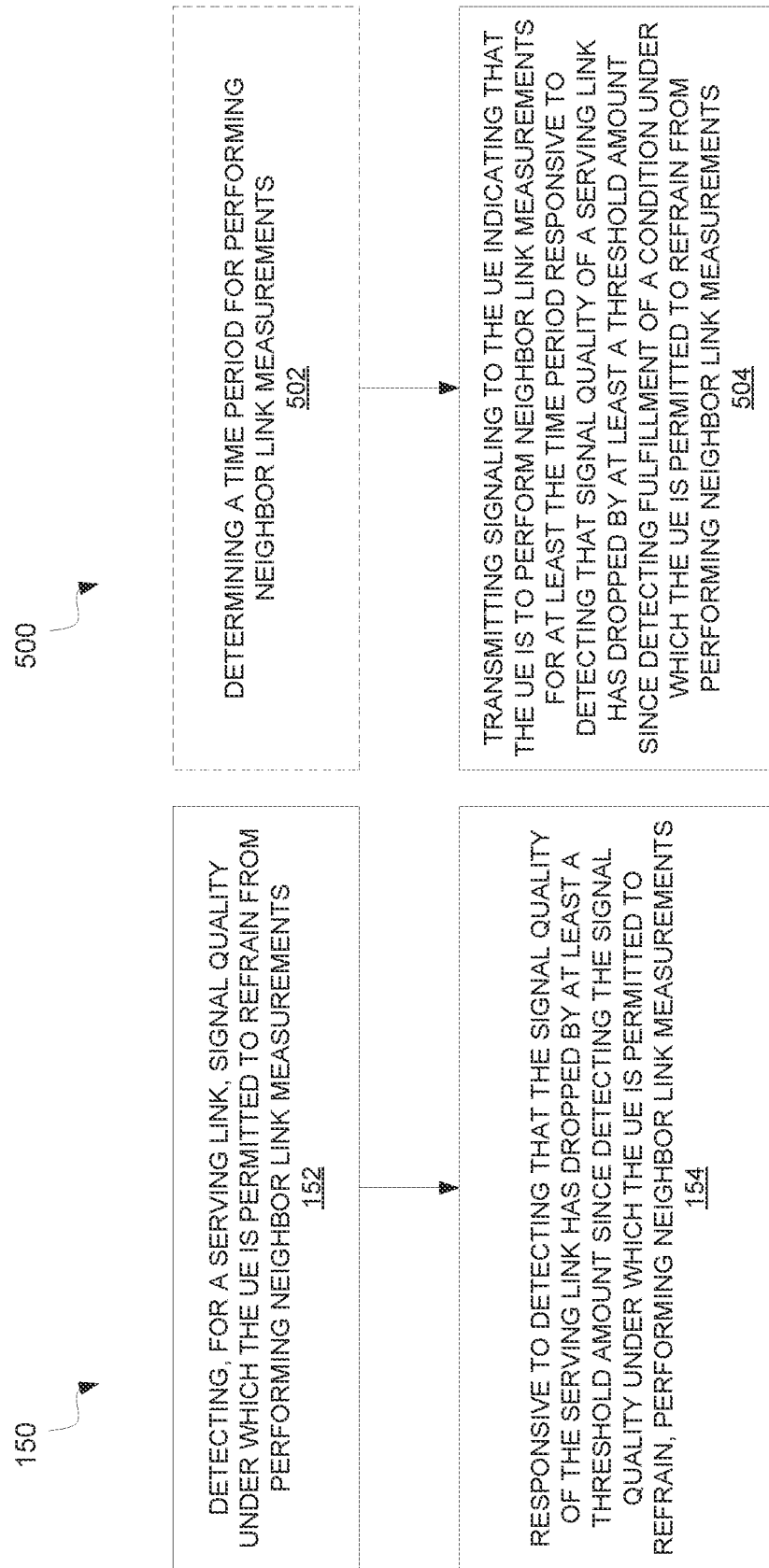

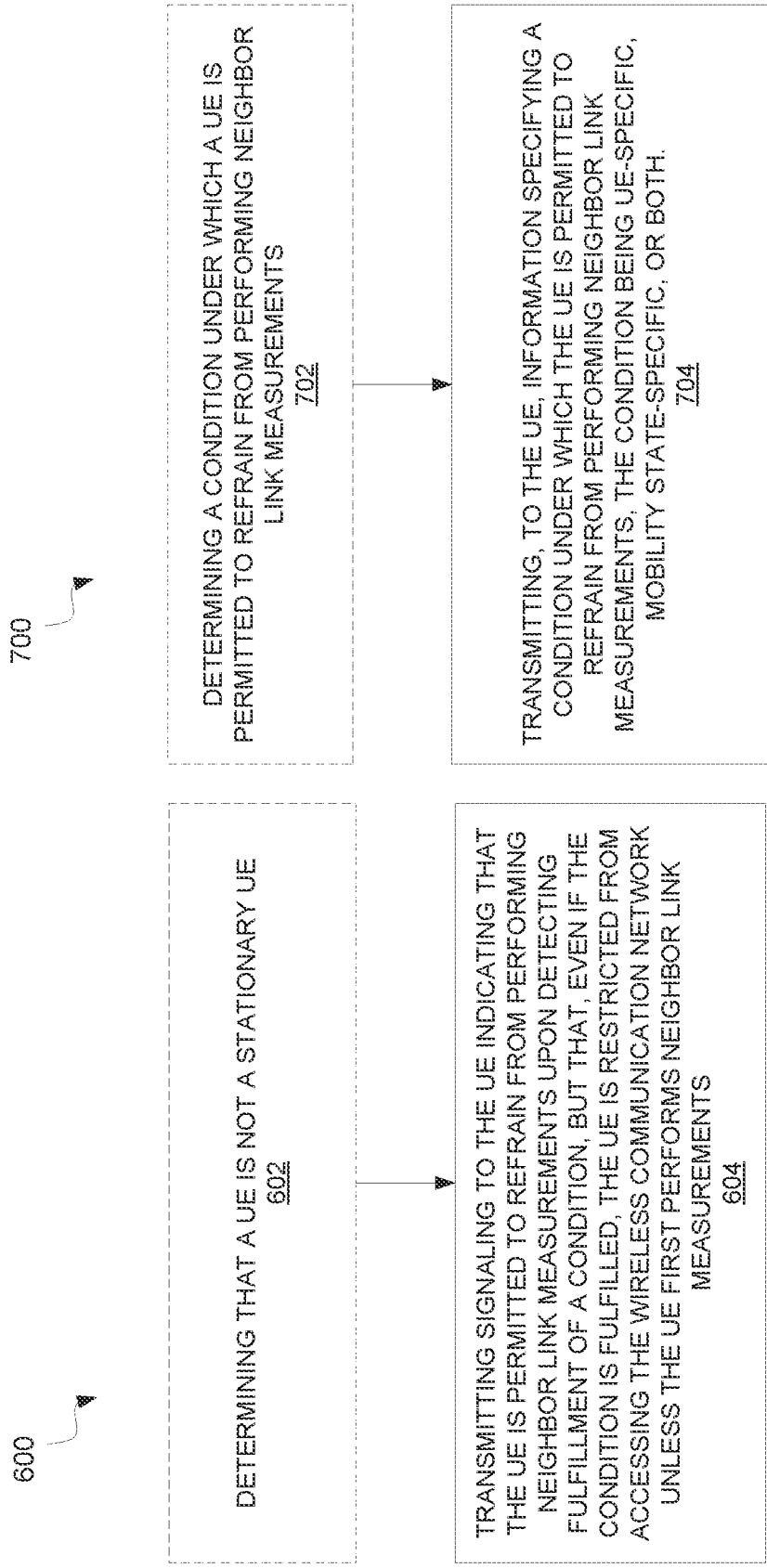

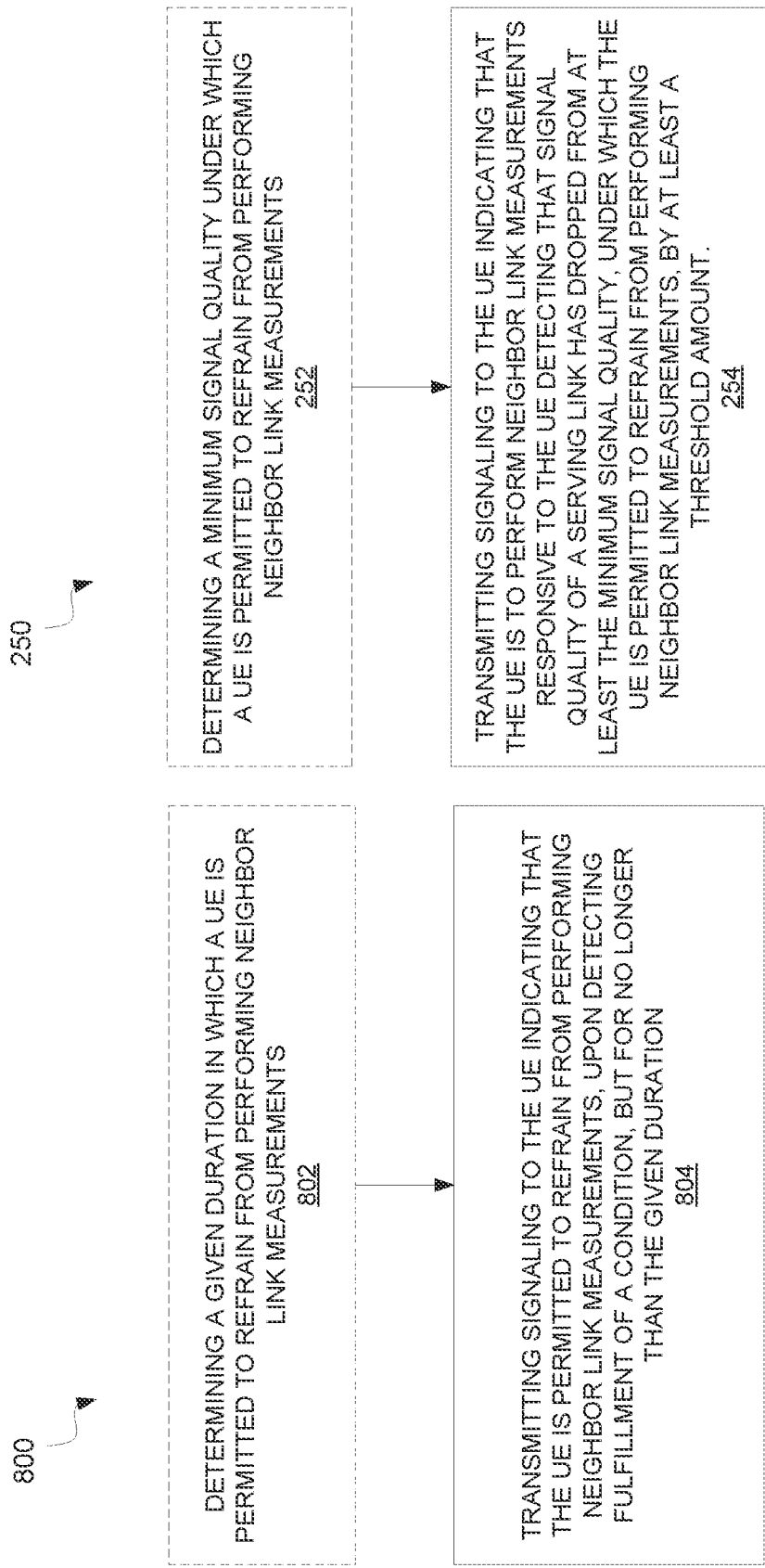

NB-IOT DEVICE PERFORMING NEIGHBORING LINK MEASUREMENT DESPITE REFRAINING CONDITION

RELATED APPLICATIONS

This application is a continuation of prior U.S. application Ser. No. 16/604,299 filed 10 Oct. 2019, which was the National Stage of International Application PCT/EP2018/057070 filed 20 Mar. 2018, which claims the benefit of U.S. Provisional Application No. 62/485,808 filed 14 Apr. 2017, the entire disclosure of each being hereby incorporated by reference herein.

TECHNICAL FIELD

Embodiments herein generally relate to a wireless communication network, and more particularly to performing link measurements therein.

BACKGROUND

A wireless communication network may include one or more base stations. A user equipment (UE) seeking access to the wireless communication network may perform link measurements to locate a suitable base station. Performing link measurements consumes power. However, failing to perform link measurements may result in the UE attempting to access the network via a base station serving a link of poorer signal quality than is available from a neighboring base station, which may result in the UE having to transmit at higher power than necessary. Accordingly, performing link measurements too often, or too infrequently, may waste power.

SUMMARY

Embodiments of the present disclosure are generally directed to a UE determining when to perform neighbor link measurements. Such a determination may be performed by the UE using criteria preconfigured at the UE, or configured by signaling transmitted from a base station. In particular, the UE may evaluate one or more conditions to determine whether to perform neighbor link measurements. Evaluation of such condition(s) may enable the UE to determine if, and to what extent, performing neighbor link measurements are mandatory or optional. For example, a first condition may be a condition under which the UE is permitted to refrain from performing neighbor link measurements, and when the first condition is not met, the UE may be required to perform neighbor link measurements. Further embodiments may also include a second condition which, if met while the UE is permitted to refrain from performing neighbor link measurements, configures (and/or requires) the UE to perform such measurements anyway.

In particular, embodiments of the present disclosure include a first method, implemented in a user equipment (UE), for performing link measurements in a wireless communication network. The first method comprises detecting fulfillment of a condition under which the UE is permitted to refrain from performing neighbor link measurements, and responsive to detecting that signal quality of a serving link has dropped by at least a threshold amount since detecting the fulfillment of the condition, performing neighbor link measurements.

Embodiments of the present disclosure also include a second method, implemented in a user equipment (UE), for accessing a link in a wireless communication network. The second method comprises detecting fulfillment of a condition under which the UE is permitted to refrain from performing neighbor link measurements, and responsive to determining to access the wireless communication network while permitted to refrain from performing neighbor link measurements, performing neighbor link measurements.

Embodiments of the present disclosure also include a third method, implemented in a user equipment (UE), for evaluating permission in a wireless communication network. The third method comprises determining whether the UE is permitted to refrain from performing neighbor link measurements based on whether a condition is fulfilled, the condition being UE-specific, mobility state-specific, or both.

Embodiments of the present disclosure also include a fourth method, implemented in a user equipment (UE), for performing link measurements in a wireless communication network. The fourth method comprises detecting fulfillment of a condition under which the UE is permitted to refrain from performing neighbor link measurements, and responsive to detecting, while the UE is permitted to refrain from performing neighbor link measurements, that neighbor link measurements have not been performed for more than a threshold period, performing neighbor link measurements.

Embodiments of the present disclosure also include a fifth method, implemented in a base station in a wireless communication network, of configuring a user equipment (UE). The fifth method comprises transmitting signaling to the UE indicating that the UE is to perform neighbor link measurements for at least a time period responsive to detecting that signal quality of a serving link has dropped by at least a threshold amount since detecting fulfillment of a condition under which the UE is permitted to refrain from performing neighbor link measurements.

Embodiments of the present disclosure also include a fifth method, implemented in a base station in a wireless communication network, of configuring a user equipment (UE). The fifth method comprises a sixth method, implemented in a base station in a wireless communication network, of configuring a user equipment (UE). The sixth method comprises transmitting signaling to the UE indicating that the UE is permitted to refrain from performing neighbor link measurements upon detecting fulfillment of a condition, but that, even if the condition is fulfilled, the UE is restricted from accessing the wireless communication network unless the UE first performs neighbor link measurements.

Embodiments of the present disclosure also include a seventh method, implemented in a base station in a wireless communication network, of configuring a user equipment (UE). The seventh method comprises transmitting the signaling indicating that the UE is restricted from accessing the wireless communication network unless the UE first performs neighbor link measurements is responsive to determining that the UE is not a stationary UE.

Embodiments of the present disclosure also include an eighth method, implemented in a base station in a wireless communication network, of configuring a user equipment (UE). The eighth method comprises transmitting, to the UE, information specifying a condition under which the UE is permitted to refrain from performing neighbor link measurements, the condition being UE-specific, mobility state-specific, or both.

Embodiments of the present disclosure also include a ninth method, implemented in a base station in a wireless communication network, of configuring a user equipment (UE). The ninth method comprises transmitting signaling to the UE indicating that the UE is permitted to refrain from performing neighbor link measurements, upon detecting fulfillment of a condition, but for no longer than a given duration.

Embodiments of the present disclosure also include a tenth method, implemented in a user equipment (UE), for performing link measurements in a wireless communication network. The method comprises detecting, for a serving link, signal quality under which the UE is permitted to refrain from performing neighbor link measurements, and responsive to detecting that the signal quality of the serving link has dropped by at least a threshold amount since detecting the signal quality under which the UE is permitted to refrain, performing neighbor link measurements.

In one or more of the above embodiments implemented in a UE, the method further comprises determining that the UE is permitted to refrain from performing neighbor link measurements. In some such embodiments, determining that the UE is permitted to refrain from performing neighbor link measurements comprises determining that the signal quality is at least a minimum amount over a threshold. Additionally or alternatively, determining that the UE is permitted to refrain from performing neighbor link measurements comprises determining whether neighbor link measurements have been previously performed within a threshold period.

In one or more of the above embodiments implemented in a UE, the method further comprises receiving signaling indicating the threshold amount.

In one or more of the above embodiments implemented in a UE, the method further comprises receiving signaling indicating a time period for performing the neighbor link measurements.

In one or more of the above embodiments implemented in a UE, the method further comprises receiving signaling indicating that the UE is permitted to refrain from performing neighbor link measurements for no longer than a given duration.

In one or more of the above embodiments implemented in a UE, the method further comprises receiving broadcast signaling specifying a non-UE-specific base value for a condition under which the UE is permitted to refrain from performing the neighbor link measurements, and UE-specific signaling indicating a UE-specific modifier to the base value.

In one or more of the above embodiments implemented in a UE, the signal quality under which the UE is permitted to refrain from performing neighbor link measurements is an updated signal quality relative to a previous signal quality detected by the UE under which the UE was previously permitted to refrain from performing neighbor link measurements. In at least one such embodiment, the method further comprises updating the previous signal quality with the updated signal quality responsive to the updated signal quality being higher than the previous signal quality.

Embodiments of the present disclosure also include an eleventh method, implemented in a base station in a wireless communication network, of configuring a user equipment (UE). The method comprises transmitting signaling to the UE indicating that the UE is to perform neighbor link measurements responsive to the UE detecting that signal quality of a serving link has dropped from at least a minimum signal quality, under which the UE is permitted to refrain from performing neighbor link measurements, by at least a threshold amount.

In one or more of the above embodiments implemented in a base station, the signaling indicates the threshold amount.

In one or more of the above embodiments implemented in a base station, the signaling indicates a time period for performing the neighbor link measurements.

In one or more of the above embodiments implemented in a base station, at least some of the signaling is UE-specific.

In one or more of the above embodiments implemented in a base station, the signaling to the UE further indicates that the UE is permitted to refrain from performing neighbor link measurements for no longer than a given duration.

In one or more of the above embodiments implemented in a base station, the signaling comprises broadcast signaling specifying a non-UE-specific base value for a condition under which the UE is permitted to refrain from performing the neighbor link measurements, and UE-specific signaling indicating a UE-specific modifier to the base value.

Other embodiments include corresponding apparatus (e.g., UE, base station), systems, computer programs, non-transitory computer readable mediums storing such computer programs, and carriers.

BRIEF DESCRIPTION OF THE DRAWINGS

Aspects of the present disclosure are illustrated by way of example and are not limited by the accompanying figures, with like references indicating like elements. In general, the use of a reference numeral should be regarded as referring to the depicted subject matter according to one or more embodiments, whereas discussion of a specific instance of an illustrated element will append a letter designation thereto (e.g., discussion of a base station 12, generally, as opposed to discussion of particular instances of base stations 12a, 12b).

FIGS. 2-6 are flow diagrams, each of which illustrates an example method, implemented in a UE, according to one or more embodiments.

FIGS. 7-11 are flow diagrams, each of which illustrates an example method, implemented in a base station, according to one or more embodiments.

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to at least one of each of the items in the list (e.g., at least one of A and at least one of B).

Figure 1:
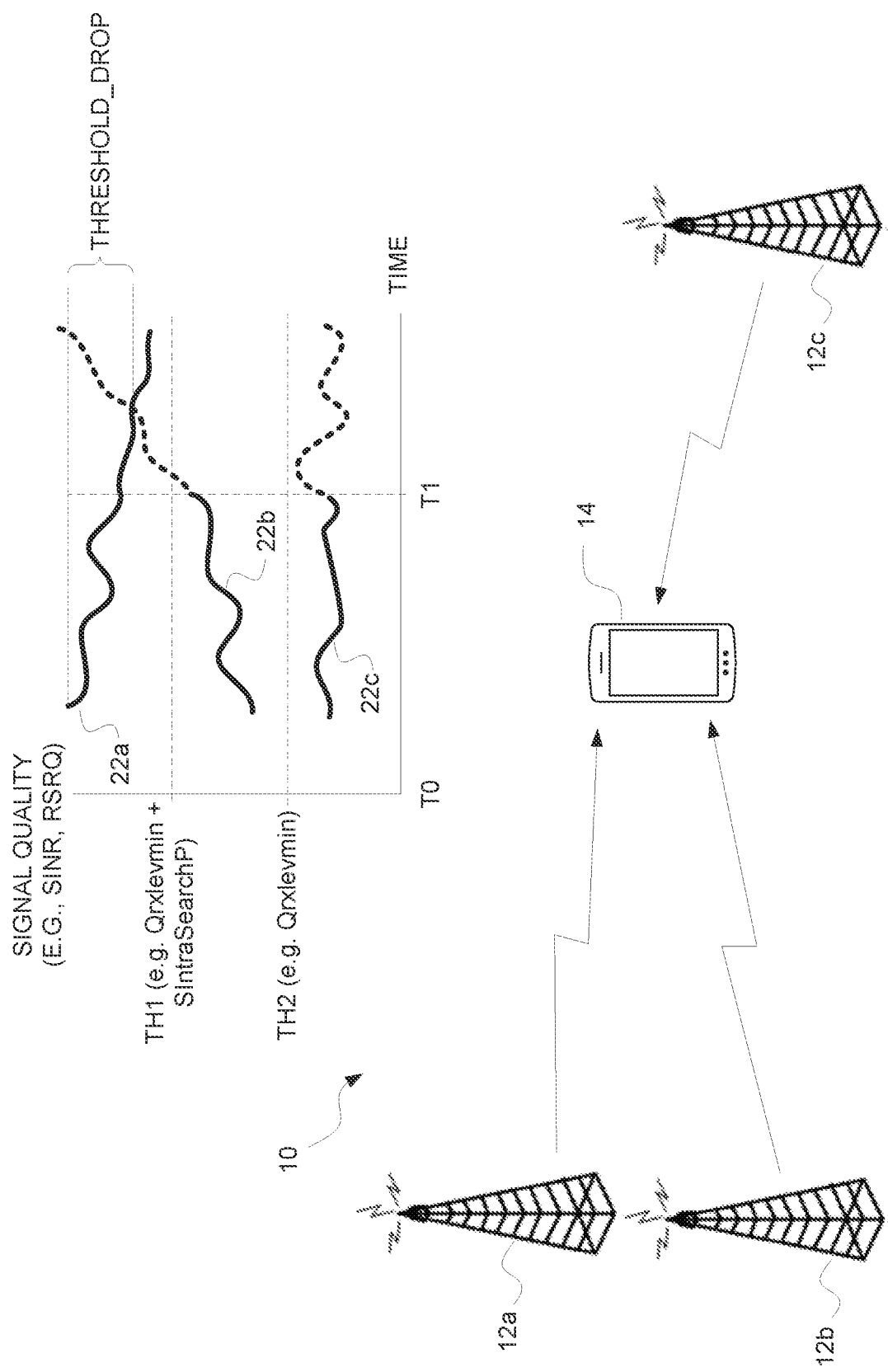
FIG. 1 illustrates an example wireless communication system in which a UE performs link measurements, according to one or more embodiments.

FIG. 1 illustrates an example wireless communication system 10 according to one or more embodiments. Embodiments of the system 10 may include one or more base stations (e.g., one or more enhanced Node Bs (eNBs)), three of which are shown in FIG. 1 as base stations 12a, 12b, and 12c. Embodiments of the system 10 also include one or more user equipment (UE) (e.g., Narrowband (NB) Internet of Things (IoT) or enhanced Machine Type Communication (eMTC) devices), an example of which is shown in FIG. 1 as UE 14. According to embodiments, one or more of the base stations 12a-c may be configured to provide UE 14 with access to a wireless communication network, as will be discussed in greater detail below.

Base stations 12, generally, control the use of radio resources for transmissions in the system 10 (e.g., within respective cells or beams controlled by those base stations). Base stations 12 control radio resource usage for transmissions by scheduling those transmissions to occur on certain radio resources over certain time periods. Radio resources may include for instance frequency resources, code resources, time resources, spatial resources, any combination thereof, or any other resource on which a radio transmission is performed. The time period over which a transmission is scheduled may be indicated or reflected by the radio resource on which the transmission is scheduled. For example, where a radio resource is a time-frequency resource such as a radio block (e.g., 12 subcarriers over a 1 ms subframe), the scheduled time period may be the duration of the resource.

In some embodiments, the system 10 may be, for instance, a narrowband IoT (NB-IoT) system and/or an enhanced machine type communication (eMTC) system. NB-IoT, in particular, is a narrowband system developed for cellular internet of things by 3GPP in Rel-13. The system 10 may be designed based on existing Long Term Evolution (LTE) systems, e.g., to provide enhanced network architecture and improve indoor coverage for massive number of devices. Examples of such devices may be low throughput (e.g. 2 kbps), have low delay sensitivity (e.g., ~10 seconds), be ultra-low cost (e.g., below 5 dollars), have low power consumption (e.g., battery life of 10 years), and operate with extended coverage (e.g., to address deep indoor, up to 164 dB coupling loss). Examples of such a system may include base stations 12 that serve cells as a means of providing a link to a UE 14. An example of such a cell (e.g., ~1 km2 cell) may serve thousands (e.g., ~50 thousand) of devices. Other examples of such a system may include base stations 12 that serve beams as a means of providing a link to a UE 14. Examples of the above-discussed devices may include sensors, meters, actuators, and alike, among other things. In order to be able to make use of existing spectrum for, e.g., GSM, a fairly narrow bandwidth may be adopted. For example, the entire bandwidth may be contained within 200 kHz or one physical resource block (PRB), i.e. 12 subcarriers of 15 kHz each, which may be referred to as one carrier or one PRB.

Embodiments of the system 10 (and particularly NB-IoT embodiments) may include a base station 12 that provides extended coverage by repeating a downlink (DL) data transmission towards an NB-IoT UE. Similarly, in the uplink (UL), the UE may repeat its transmission in order to reach the base station 12. In either case, whichever side is receiving may soft-combine the repetitions before decoding.

Particular embodiments of the system 10 may support Full Division Duplex (FDD) mode (i.e., a mode in which a transmitter and a receiver operate at different carrier frequencies), yet only need to support half-duplex in the UE. In such an embodiment, coverage may be improved through the data repetition in the UL and/or DL discussed above. Lower complexity devices (e.g. only one transmission/receiver chain) in particular may take advantage of such repetition even under normal coverage.

UE complexity may further be alleviated by using cross-subframe scheduling. For example, a transmission may be first scheduled on a Narrowband Physical DL Control Channel (NPDCCH) and then the first transmission of the actual data on the Narrowband Physical DL Shared Channel (NPDSCH) may be carried out after the final transmission of the NPDCCH. Similarly, for uplink (UL) data transmission, information about resources scheduled by the network and needed by the UE for UL transmission may be first conveyed on the NPDCCH and then the first transmission of the actual data by the UE on the Narrowband Physical UL Shared Channel (NPUSCH) may be carried out after the final transmission of the NPDCCH. In other words, in either or both of the cases above, there may be no simultaneous reception of control channel and reception/transmission of data channel from the UE's perspective. Of note and in view of the above, in some embodiments of the system 10, communication between the eNB and the UE may block the entire system bandwidth over an extended period of time potentially leading to starvation of other UEs in need of communication.

According to embodiments, UE 14 measures signals transmitted by the base stations 12a-c to determine a signal quality of at least one link provided by each. As will be explained below, the UE 14 may compare the measured signal quality to one or more signal quality thresholds (e.g., TH1 and/or TH2) in order to make certain operational decisions within the system 10. For example, threshold TH2 may designate a minimum signal quality that the UE 14 must detect from a base station 12 in order to camp on that base station 12. As another example, threshold TH1 may designate a minimum signal quality that the UE 14 must detect from a base station 12 in order to be permitted to refrain from performing measurements of neighbor links. Other examples may use additional or fewer thresholds, any of which may be different from the examples described above.

A given threshold may be broadcast to the UE 14 by a base station 12 or may be preconfigured at the UE 14. Further, a given threshold may be represented as an absolute value, or a relative value. For example, a base station 12 may broadcast TH2 as an absolute signal quality value (e.g., in dBm), and broadcast TH1 as an amount of signal quality (e.g., in dBm) above TH2. For example, threshold TH1 may be called SIntraSearchP, the value of which specifies a minimum amount over threshold TH2 that, if observed by a UE 14, permits the UE to forego performing measurements on links served by neighbor cells, e.g., to save power.

Particular embodiments may allow for power saving for a UE 14 (e.g., in deep indoor coverage) by configuring the SIntraSearchP value to values that are quite low (e.g., to be more permissive with respect to when the UE 14 may refrain from performing neighbor cell measurements). Foregoing measurements may be particularly advantageous in some embodiments in which the UE 14 is battery-powered or under other particular power constraints.

The graph in FIG. 1 illustrates example plots 22a-c of signal quality over time with respect to the example thresholds TH1 and TH2 discussed above. The solid lines along plots 22a-c represent signal quality measured by the UE 14 from signals transmitted by the base stations 12a-c, respectively. The dashed lines along plots 22b-c represent signal quality that would have been detected by the UE 14 had the UE 14 performed measurements of the corresponding links at that time.

According to this example, between time T0 to T1, plot 22a-c reflect the first, second, and third best signal qualities, respectively (though this changes after time T1). In particular, between the time T0 and T1, plot 22a is entirely above TH1, plot 22b is entirely between thresholds TH1 and TH2, and plot 22c is entirely below thresholds TH1 and TH2 throughout the time T0 to T1.

In view of the plots 22a-c and the examples of TH1 and TH2 described above, UE 14 may be permitted to camp on base stations 12a and 12b, but not on base station 12c. According to this example, the UE 14 decides to camp on base station 12a. Further, because the signal quality measured from base station 12a is above threshold TH1, the UE 14 determines that it is permitted to refrain from performing neighbor link measurements on base stations 12b-c, and decides to do so. Accordingly, UE 14 fails to detect that after time T1, the signal quality available from base station 12b surpasses that which is available from base station 12a.

There are many potential causes that may result in signal quality results similar to those illustrated in FIG. 1. For example, the transmission repetition described above may, e.g., permit base station 12a to reach the UE 14 even when the UE 14 is located deep indoors. However, once UE 14 is permitted to refrain from performing neighbor cell measurements, the UE 14 may move outside over a fairly long distance while yet continuing to observe signal quality on its serving link from base station 12a of more than TH1, even after moving quite close to base station 12b, from which it could be receiving a stronger signal.

Indeed, a UE 14 in outdoor coverage may be able to operate at quite low signal quality (e.g., as measured in Signal to Interference Plus Noise Ratio (SINR) and/or Reference Signal Received Power (RSRP)) of their serving links while still satisfying the cell selection criteria by more than a SIntraSearchP amount of decibel-milliwatts (dBm). As a result, a UE 14 permitted to turn off their neighbor cell measurements may lead to scenarios in which the UE 14, for example, has gone far into other cells without having noticed it. Such a UE 14 may cause a lot of interference, waste a lot of battery power, and/or waste a lot of network capacity due to high numbers of UL/DL data repetitions in order to reach the network. In view of this, embodiments of the present disclosure may, among other things, allow for power savings (e.g., when the UE 14 is deep in indoor coverage) yet also allow for the UE 14 to detect when they are getting close to other cells in its vicinity and reselect to a better cell (e.g., when the UE 14 is outdoors). Particular embodiments taken advantage of periodic measurements and/or tracking of signal quality measurements (e.g., SINR, Reference Signal Received Quality (RSRQ), and/or the like) and/or one or more dedicated measurement thresholds.

From here on, and to explain particular example embodiments (e.g., with respect to general mathematical concepts), the further terms Srxlev, Qrxlevmeas, and Qrxlevmin may be used as shorthand for various values. In particular, Srxlev is a link signal level received selection value. Qrxlevmeas is the measured RSRP of the serving link. Qrxlevmin is the minimum required RSRP for camping on a link. According to such embodiments, Srxlev may be substantially equal to Qrxlevmeas−Qrxlevmin (i.e., ignoring certain other factors that may influence this relationship that are not addressed in this disclosure, such as factors relating to compensation and/or one or more temporary offsets that may be configured within the system 10 for various purposes). Consistent with the above, an Srxlev<=SIntraSearchP may trigger neighbor link measurements (e.g., to potentially select a different link served by a different base station to camp on), and Srxlev>SIntraSearchP may indicate that the UE 14 is permitted to refrain from such measurements.

Embodiments of the present disclosure may tune SIntraSearchP to such that UEs perform cell measurements sufficiently often to detect when better links are available (e.g., particularly when UEs are outdoors) and such that unnecessary neighbor cell measurements are avoided (e.g., particularly when UEs are indoors).

According to particular embodiments, the UE 14 determines when to perform neighbor link measurements, even when it is permitted to refrain from doing so. In some such embodiments, when the UE 14 detects that it can turn off neighbor link measurements (e.g., when Srxlev>SIntraSearchP), the UE 14 takes a snapshot of its serving link RSRQ and/or SINR (called RSRQ_snapshot SINR_snapshot hereafter), and continues to measure RSRP, RSRQ, and/or SINR of its own serving link. For example, both RSRQ and SINR are indicative of interference/noise such that a UE 14 moving towards a neighboring base station 12b and/or a link provided by neighboring base station 12b being turned on in the vicinity of the UE 14 would lead to a drop in RSRQ/SINR as a result of increased interference. However, a UE 14 moving deeper indoors would also experience a drop in RSRQ/SINR as a result of dropped signal level (i.e., as opposed to signal interference).

In view of the above, a large drop in measured RSRQ and/or SINR compared to the snapshot value may trigger the UE to perform neighbor link measurement, even if permitted to refrain from doing so, to recheck whether it is still camped on the best link. In other words, if, e.g., RSRQ_snapshot−current RSRQ>threshold_drop, the UE 14 starts neighbor link measurement. Further, the UE 14 may continue such measurement for a given period (e.g., some X number of seconds). If the serving link is still the best link, then the UE may again be permitted to turn off neighbor link measurements.

In some embodiments, the UE 14 may additionally or alternatively take new snapshots that may be considered while the UE 14 is permitted to refrain from performing neighbor link measurements. In particular, a raise in current RSRQ and/or SINR may trigger the UE 14 to update RSRQ_snapshot and/or SINR_snapshot.

According to particular embodiments, the timer X and/or one or more of the thresholds mentioned herein (e.g., threshold_drop) may be configurable by the network. For example, the network may provide one or more of these values to the UE 14 via broadcast and/or dedicated signaling. Additionally or alternatively, one or more such values may be predefined (e.g. in 3GPP specifications).

Additionally or alternatively to any of the above, the UE 14 may be required to perform link measurements before accessing the network, e.g., to make sure it is performing access using the best available link. To be clear, accessing the network may particularly be a process that include the UE 14 establishing a Radio Resource Control (RRC) connection with a base station 12 from an idle, disconnected state, e.g., in order to place a call. Thus, a UE 14 in an RRC_IDLE state may be camped on a link served by base station 12a, detect that Srxlev>SIntraSearchP from measurements of that serving link, and thus be permitted to refrain from performing neighbor link measurements. Nonetheless, access to the network may be conditioned upon the UE 14 performing neighbor link measurements to ensure that the link served by base station 12a is best (as shown in FIG. 1 between times T0 and T1), or whether, e.g., base station 12b serves a better link (as shown to begin occurring according to FIG. 1 sometime after T1).

Measurement behavior with respect to access may be configurable, according to particular embodiments. For example, the network may determine that the UE 14 is not a stationary UE (e.g., based on historical positioning, access, and/or other information) and configure the UE 14 such that, such that the UE is mandated to perform the aforementioned measurements before access. In another aspect of the present invention, this behavior (measurement before access) is configured together with a timer-window such that the UE is not required to perform measurements every single time before access. For example, the UE may be performing data access frequently, and measurements each time may be excessive.

Additionally or alternatively, a UE 14 may be configured with UE-specific SIntraSearchP thresholds (or a specific multiplication factor applicable to a SIntraSearchP threshold broadcast to multiple UEs). This UE-specific SIntraSearchP may be transmitted by the network (i.e., from a base station 12) via dedicated signaling. This SIntraSearchP may be, e.g., based on particular network knowledge. Such knowledge may be, for example, based on historical knowledge, and/or measured angle of arrival (AoA), and/or timing advance (TA), and/or the like.

Additionally or alternatively, the UE may be mandated to carry out neighbor cell measurements on a periodic basis despite fulfillment of the criteria Srxlev>SIntraSearchP. Such a period may be configurable via broadcast and/or UE-specific information and may be provided via dedicated and/or broadcast signaling, consistent with various of the above embodiments.

Additionally or alternatively, a set of SIntraSearchPs (or a multiplication factor thereof) and/or a set of periodic timers (such as the timer X mentioned above) may be based on an RSRQ and/or SINR table which is either predefined or configurable by the network. In such embodiments in which such information is configurable by the network, such may be provided to the UE, e.g., via broadcast signaling, dedicated signaling, or a combination thereof. The UE 14 may then use an appropriate SIntraSearchP and/or the period timer from such information based on measurement of its serving link (e.g., measurement of RSRQ and/or SINR).

Additionally or alternatively, one or more of the parameters mentioned above (e.g., SintraSearchP, Timer X, threshold_drop, timer-window) may be adapted to a mobility state of the UE 14. For example, the UE 14 may use different values for one or more of the above when it is fast-moving fast as opposed to when it is slow-moving (e.g., with respect to a given speed threshold). Similarly, a static (i.e., stationary) UE may use different values for one or more of the above then a mobile UE (e.g., a smartphone). Such a mobility state may additionally or alternatively be based on an amount of link reselection carried out within a time window and furthermore may be reported to the network upon access. Adaptation of such parameters may be performed via specific values and/or through the use of scaling factors, according to embodiments. Further, such values and/or scaling factors may be predefined and/or configurable, according to particular embodiments.

Thus, in view of the above, embodiments of the present disclosure include a UE 14 that tracks interference levels during a power save state (e.g., in which the UE 14 is refraining from performing neighbor link measurements but is performing serving link measurements) and starts neighbor cell measurements upon increased interference. Further, according to embodiments, the network may send tailored configuration to the UE 14 (or multiple UEs) depending on mobility rate and coverage of the UE(s) 14.

In view of all of the above, FIG. 2 illustrates a method 100, implemented in a UE 14, for performing link measurements in a wireless communication network. The method 100 comprises detecting fulfillment of a condition under which the UE 14 is permitted to refrain from performing neighbor link measurements (block 102), and responsive to detecting that signal quality of a serving link has dropped by at least a threshold amount since detecting the fulfillment of the condition, performing neighbor link measurements (block 104).

FIG. 3 illustrates a method 200, implemented in a UE 14, for accessing a link in a wireless communication network. The method 200 comprises detecting fulfillment of a condition under which the UE 14 is permitted to refrain from performing neighbor link measurements (block 202), and responsive to determining to access the wireless communication network while permitted to refrain from performing neighbor link measurements, performing neighbor link measurements (block 204).

FIG. 4 illustrates a method 300, implemented in a UE 14, for evaluating permission in a wireless communication network. The method 300 comprises determining whether the UE 14 is permitted to refrain from performing neighbor link measurements based on whether a condition is fulfilled, the condition being UE-specific, mobility state-specific, or both (block 304). In some embodiments, the method 300 further comprises receiving UE-specific signaling indicating the condition (block 302), e.g., so that the UE 14 may determine whether it is permitted to refrain from performing the neighbor link measurements based on whether that condition is fulfilled (block 304).

FIG. 5, illustrates a method 400, implemented in a UE 14, for performing link measurements in a wireless communication network. The method 400 comprises detecting fulfillment of a condition under which the UE is permitted to refrain from performing neighbor link measurements (block 402), and responsive to detecting, while the UE 14 is permitted to refrain from performing neighbor link measurements, that neighbor link measurements have not been performed for more than a threshold period, performing neighbor link measurements (block 404).

FIG. 6 illustrates a method 150, implemented in a UE 14, for performing link measurements in a wireless communication network. The method 450 comprises detecting, for a serving link, signal quality under which the UE 14 is permitted to refrain from performing neighbor link measurements (block 152), and responsive to detecting that the signal quality of the serving link has dropped by at least a threshold amount since detecting the signal quality under which the UE 14 is permitted to refrain, performing neighbor link measurements (block 154).

FIG. 7 illustrates a method 500, implemented in a base station 12 in a wireless communication network, of configuring a UE 14. The method 500 comprises transmitting signaling to the UE 14 indicating that the UE 14 is to perform neighbor link measurements for at least a time period responsive to detecting that signal quality of a serving link has dropped by at least a threshold amount since detecting fulfillment of a condition under which the UE 14 is permitted to refrain from performing neighbor link measurements (block 504). In some such embodiments, the method 500 further comprises determining the time period for performing neighbor link measurements (block 502), e.g., from historical information about the UE 14, and transmitting the signaling in response (block 504).

FIG. 8 illustrates a method 600, implemented in a base station 12 in a wireless communication network, of configuring a UE 14. The method 600 comprises transmitting signaling to the UE 14 indicating that the UE 14 is permitted to refrain from performing neighbor link measurements upon detecting fulfillment of a condition, but that, even if the condition is fulfilled, the UE 14 is restricted from accessing the wireless communication network unless the UE 14 first performs neighbor link measurements. In some such embodiments, the method 600 further comprises, determining that the UE 602 is not a stationary UE (block 602) and transmitting the signaling in response (block 604).

FIG. 9 illustrates a method 700, implemented in a base station 12 in a wireless communication network, of configuring a UE. The method 700 comprises transmitting, to the UE 14, information specifying a condition under which the UE 14 is permitted to refrain from performing neighbor link measurements, the condition being UE-specific, mobility state-specific, or both (block 704). In some such embodiments, the method 700 further comprises determining the condition (block 702) (e.g., based on historical information), and transmitting the information specifying the condition to the UE 14 in response (block 704).

FIG. 10 illustrates a method 800, implemented in a base station 12 in a wireless communication network, of configuring a UE 14. The method 800 comprises transmitting signaling to the UE 14 indicating that the UE 14 is permitted to refrain from performing neighbor link measurements, upon detecting fulfillment of a condition, but for no longer than a given duration (block 804). In some such embodiments, the method 800 may further comprise determining the given duration in which the UE 14 is permitted to refrain from performing neighbor link measurements (block 802) and transmitting the signaling in response (block 804).

FIG. 11 illustrates a method 250, implemented in a base station 12 in a wireless communication network, of configuring a UE 14. The method 250 comprises transmitting signaling to the UE 14 indicating that the UE 14 is to perform neighbor link measurements responsive to the UE 14 detecting that signal quality of a serving link has dropped from at least a minimum signal quality, under which the UE 14 is permitted to refrain from performing neighbor link measurements, by at least a threshold amount (block 254). In some such embodiments, the method 250 further comprises determining the minimum signal quality under which the UE 14 is permitted to refrain from performing the neighbor link measurements (block 252), the signaling being transmitted in response (block 254).

Despite explanation in the context of NB-IoT, eMTC, and 5G in some embodiments, it will be appreciated that the techniques herein may be applied to other wireless networks. Thus, references herein to signals using terminology from the 3GPP standards should be understood to apply more generally to signals having similar characteristics and/or purposes, in other networks.

A radio node herein is any type of node capable of communicating over radio signals. A base station 12 is a radio network node of any type capable of communicating with another node over radio signals. A user equipment 14 is any type device capable of communicating with a base station 12 or another user equipment 14 over radio signals. A user equipment 14 may therefore refer to a machine-to-machine (M2M) device, a machine-type communications (MTC) device, a NB-IoT device, etc. A user equipment 14 may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. It should be understood that these devices may be UEs, but are generally configured to transmit and/or receive data without direct human interaction.

In an IOT scenario, a user equipment 14 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment 14 as described herein may be comprised in a vehicle and may perform monitoring and/or reporting of the vehicle's operational status or other functions associated with the vehicle.

Note that a UE 14 as described above may perform the processing herein by implementing any functional means or units. In one embodiment, for example, the UE comprises respective circuits configured to perform the steps shown in any of FIGS. 2-6. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 12A:
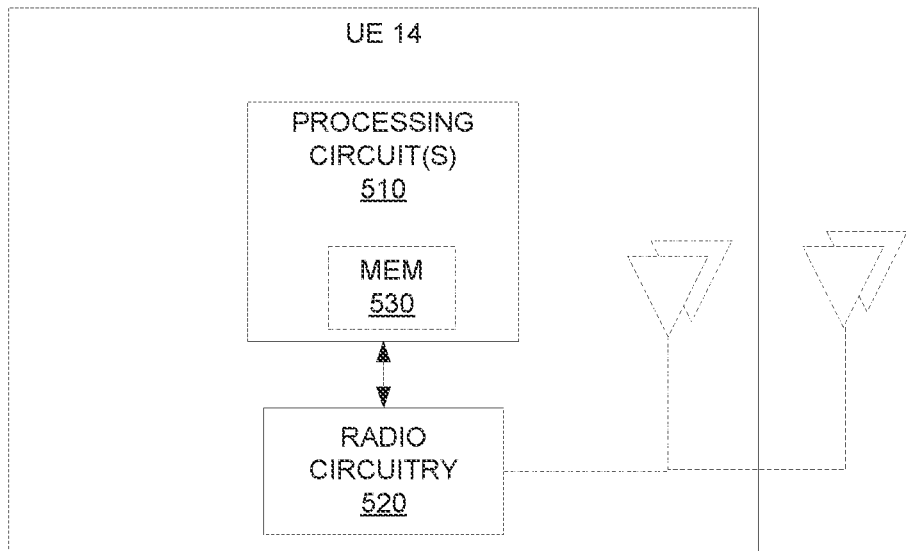
FIGS. 12A, 12B, and 15 are block diagrams, each of which illustrates a UE, according to some embodiments.

FIG. 12A illustrates additional details of a UE 14 in accordance with one or more embodiments. As shown, the UE 14 includes one or more processing circuits 510 and radio circuitry 520. The radio circuitry 520 may be configured to transmit and/or receive via one or more antennas that are internal and/or external to the UE 14. The one or more processing circuits 510 are configured to perform processing described above, e.g., in FIGS. 2, 3, 4, 5, and/or 6, such as by executing instructions stored in memory 530. The one or more processing circuits 510 in this regard may implement certain functional means or units.

Figure 12B:
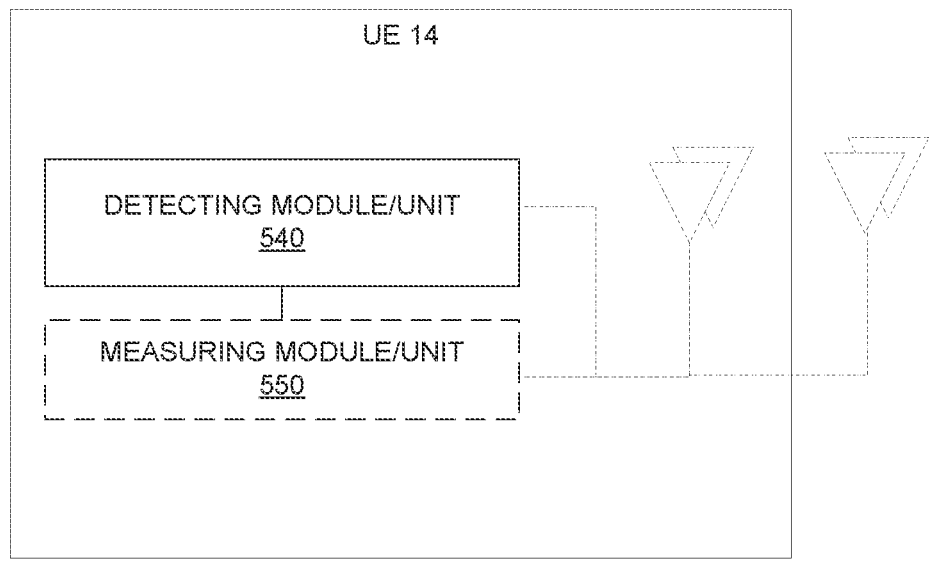

FIG. 12B in this regard illustrates additional details of a UE 14 in accordance with one or more other embodiments. Specifically, the UE 14 may include a detecting module or unit 540. In some embodiments, the detecting module or unit 540 may be configured to detect fulfillment of a condition under which the UE is permitted to refrain from performing neighbor link measurements. In some embodiments, the detecting module or unit 540 may additionally or alternatively be configured to determine whether the UE is permitted to refrain from performing neighbor link measurements based on whether a condition is fulfilled, the condition being UE-specific, mobility state-specific, or both. In some embodiments, the detecting module or unit 540 may additionally or alternatively be configured to detect, for a serving link, signal quality under which the UE 14 is permitted to refrain from performing neighbor link measurements.

In some embodiments, the UE 14 may further include a measuring module 550. According to some such embodiments, the measuring module 550 may be configured to perform neighbor link measurements responsive to the detecting module or unit 540 detecting that signal quality of a serving link has dropped by at least a threshold amount since detecting the fulfillment of the condition. According to embodiments, the measuring module 550 may additionally or alternatively be configured to perform neighbor link measurements responsive to the detecting module or unit 540 determining to access the wireless communication network while permitted to refrain from performing neighbor link measurements. According to embodiments, the measuring module 550 may additionally or alternatively be configured to perform neighbor link measurements responsive to the detecting module or unit 540 detecting, while the UE is permitted to refrain from performing neighbor link measurements, that neighbor link measurements have not been performed for more than a threshold period. According to embodiments, the measuring module 550 may additionally or alternatively be configured to perform neighbor link measurements responsive to detecting that the signal quality of the serving link has dropped by at least a threshold amount since detecting the signal quality under which the UE 14 is permitted to refrain. One or more of these modules or units 540, 550 may be implemented by the one or more processing circuits 510 in FIG. 12A.

Similarly, note that a base station 12 as described above may perform the processing herein by implementing any functional means or units. In one embodiment, for example, the base station comprises respective circuits configured to perform the steps shown in any of FIGS. 7-11. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 13A:
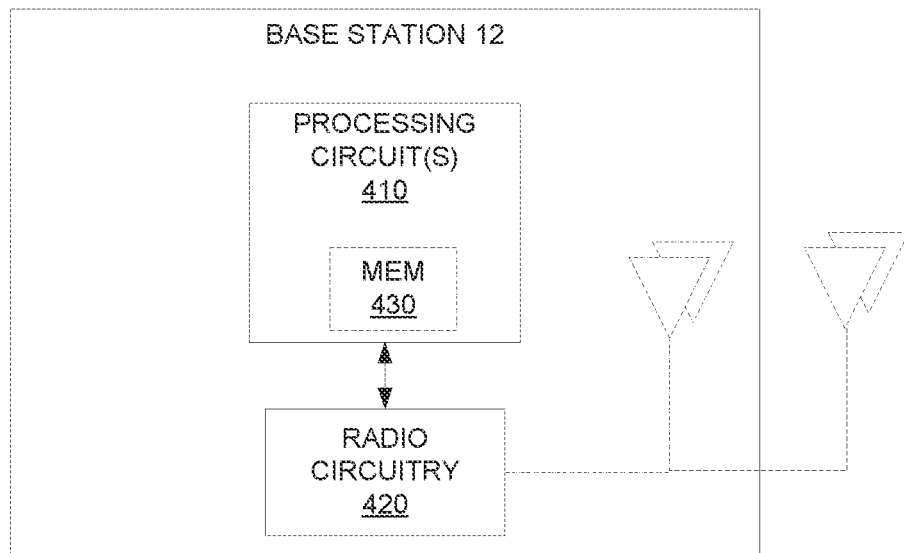
FIGS. 13A, 13B, and 14 are block diagrams, each of which illustrates a base station, according to some embodiments.

FIG. 13A illustrates additional details of a base station 12 in accordance with one or more embodiments. As shown, the base station 12 includes one or more processing circuits 410 and radio circuitry 420. The radio circuitry 420 may be configured to transmit and/or receive via one or more antennas that are internal and/or external to the base station 12. The one or more processing circuits 410 are configured to perform processing described above, e.g., in FIGS. 6, 7, 8, 9, and/or 10, such as by executing instructions stored in memory 430. The one or more processing circuits 410 in this regard may implement certain functional means or units.

Figure 13B:
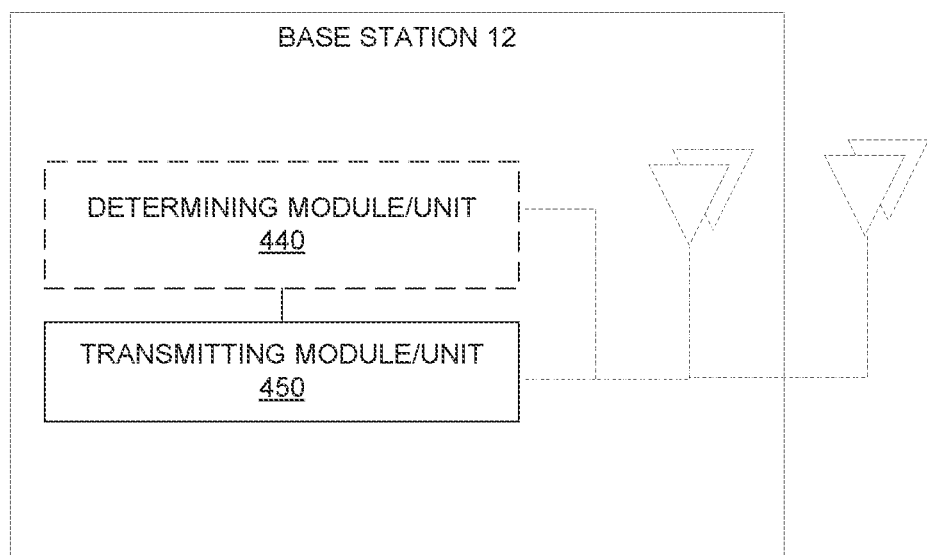

FIG. 13B in this regard illustrates additional details of a base station 12 in accordance with one or more other embodiments. Specifically, the base station 12 may include a transmitting module or unit 450. According to embodiments, the transmitting module or unit 450 may be configured to transmit signaling to the UE 14 indicating that the UE 14 is to perform neighbor link measurements for at least a time period responsive to detecting that signal quality of a serving link has dropped by at least a threshold amount since detecting fulfillment of a condition under which the UE 14 is permitted to refrain from performing neighbor link measurements. According to embodiments, the transmitting module or unit 450 may additionally or alternatively be configured to transmit signaling to the UE 14 indicating that the UE 14 is permitted to refrain from performing neighbor link measurements upon detecting fulfillment of a condition, but that, even if the condition is fulfilled, the UE 14 is restricted from accessing the wireless communication network unless the UE 14 first performs neighbor link measurements. According to embodiments, the transmitting module or unit 450 may additionally or alternatively be configured to transmit, to the UE 14, information specifying a condition under which the UE 14 is permitted to refrain from performing neighbor link measurements, the condition being UE-specific, mobility state-specific, or both. According to embodiments, the transmitting module or unit 450 may additionally or alternatively be configured to transmit signaling to the UE 14 indicating that the UE 14 is permitted to refrain from performing neighbor link measurements, upon detecting fulfillment of a condition, but for no longer than a given duration. According to embodiments, the transmitting module or unit 450 may additionally or alternatively be configured to transmit signaling to the UE 14 indicating that the UE 14 is to perform neighbor link measurements for at least a time period responsive to the UE 14 detecting that signal quality of a serving link has dropped by at least a threshold amount since detecting fulfillment of a condition under which the UE 14 is permitted to refrain from performing neighbor link measurements.

Particular embodiments of the base station 12 may further comprise a receiving module or unit (not shown) configured to receive one or more signals from the UE 14, consistent with any of the embodiments above. Particular embodiments of the base station 12 may additionally or alternatively comprise a determining module or unit 440. According to embodiments, the determining module or unit 440 may be configured to determine a time period for performing neighbor link measurements. According to embodiments, the determining module or unit 440 may additionally or alternatively be configured to determine that the UE 14 is not a stationary UE. According to embodiments, the determining module or unit 440 may additionally or alternatively be configured to determine a condition under which the UE 14 is permitted to refrain from performing neighbor link measurements. According to embodiments, the determining module or unit 440 may additionally or alternatively be configured to determine a given duration in which a UE 14 is permitted to refrain from performing neighbor link measurements. According to embodiments, the determining module or unit 440 may additionally or alternatively be configured to determine a minimum signal quality under which the UE 14 is permitted to refrain from performing neighbor link measurements. One or more of these modules or units 440, 450 may be implemented by the one or more processing circuits 410 in FIG. 13A.

Figure 14:
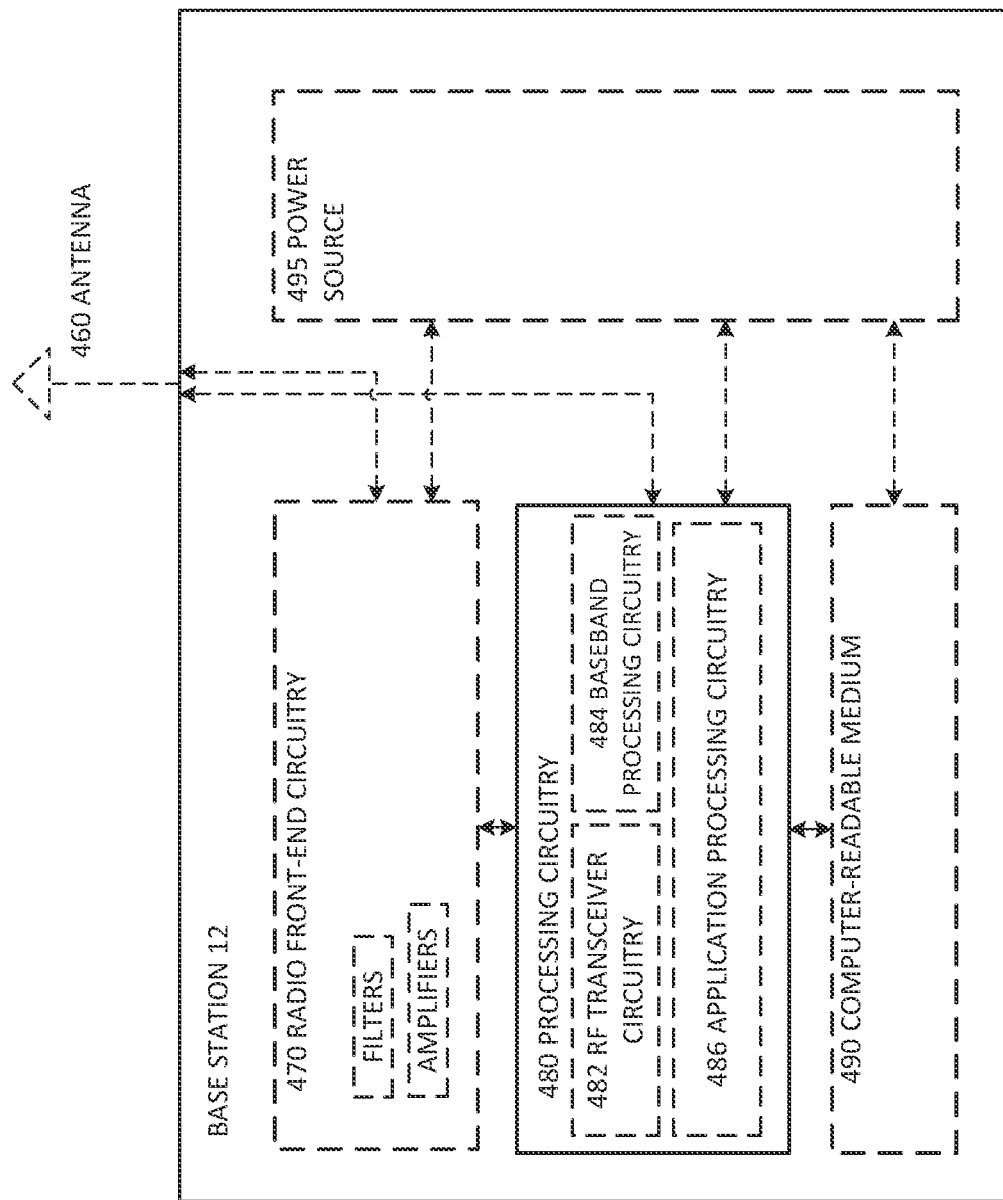

Additional details of a base station 12 are shown in relation to FIG. 14. As shown in FIG. 14, the example base station 12 includes an antenna 460, radio circuitry (e.g. radio front-end circuitry) 470, processing circuitry 480, and the base station 12 may also include a memory 490. The memory 490 may be separate from the processing circuitry 480 or an integral part of processing circuitry 480. Antenna 460 may include one or more antennas or antenna arrays, and is configured to send and/or receive wireless signals, and is connected to radio circuitry (e.g. radio front-end circuitry) 470. In certain alternative embodiments, base station 12 may not include antenna 460, and antenna 460 may instead be separate from base station 12 and be connectable to base station 12 through an interface or port.

The radio circuitry (e.g. radio front-end circuitry) 470 may comprise various filters and amplifiers, is connected to antenna 460 and processing circuitry 480, and is configured to condition signals communicated between antenna 460 and processing circuitry 480. In certain alternative embodiments, base station 12 may not include radio circuitry (e.g. radio front-end circuitry) 470, and processing circuitry 480 may instead be connected to antenna 460 without front-end circuitry 470.

Processing circuitry 480 may include one or more of radio frequency (RF) transceiver circuitry 482, baseband processing circuitry 484, and application processing circuitry 486. In some embodiments, the RF transceiver circuitry 482, baseband processing circuitry 484, and application processing circuitry 486 may be on separate chipsets. In alternative embodiments, part or all of the baseband processing circuitry 484 and application processing circuitry 486 may be combined into one chipset, and the RF transceiver circuitry 482 may be on a separate chipset. In still alternative embodiments, part or all of the RF transceiver circuitry 482 and baseband processing circuitry 484 may be on the same chipset, and the application processing circuitry 486 may be on a separate chipset. In yet other alternative embodiments, part or all of the RF transceiver circuitry 482, baseband processing circuitry 484, and application processing circuitry 486 may be combined in the same chipset. Processing circuitry 480 may include, for example, one or more central processing units (CPUs), one or more microprocessors, one or more application specific integrated circuits (ASICs), and/or one or more field programmable gate arrays (FPGAs).

The base station 12 may include a power source 495. The power source 495 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 470, processing circuitry 480, and/or memory 490. The power source 495, battery, power supply circuitry, and/or power management circuitry are configured to supply base station 12, including processing circuitry 480, with power for performing the functionality described herein.

Figure 15:
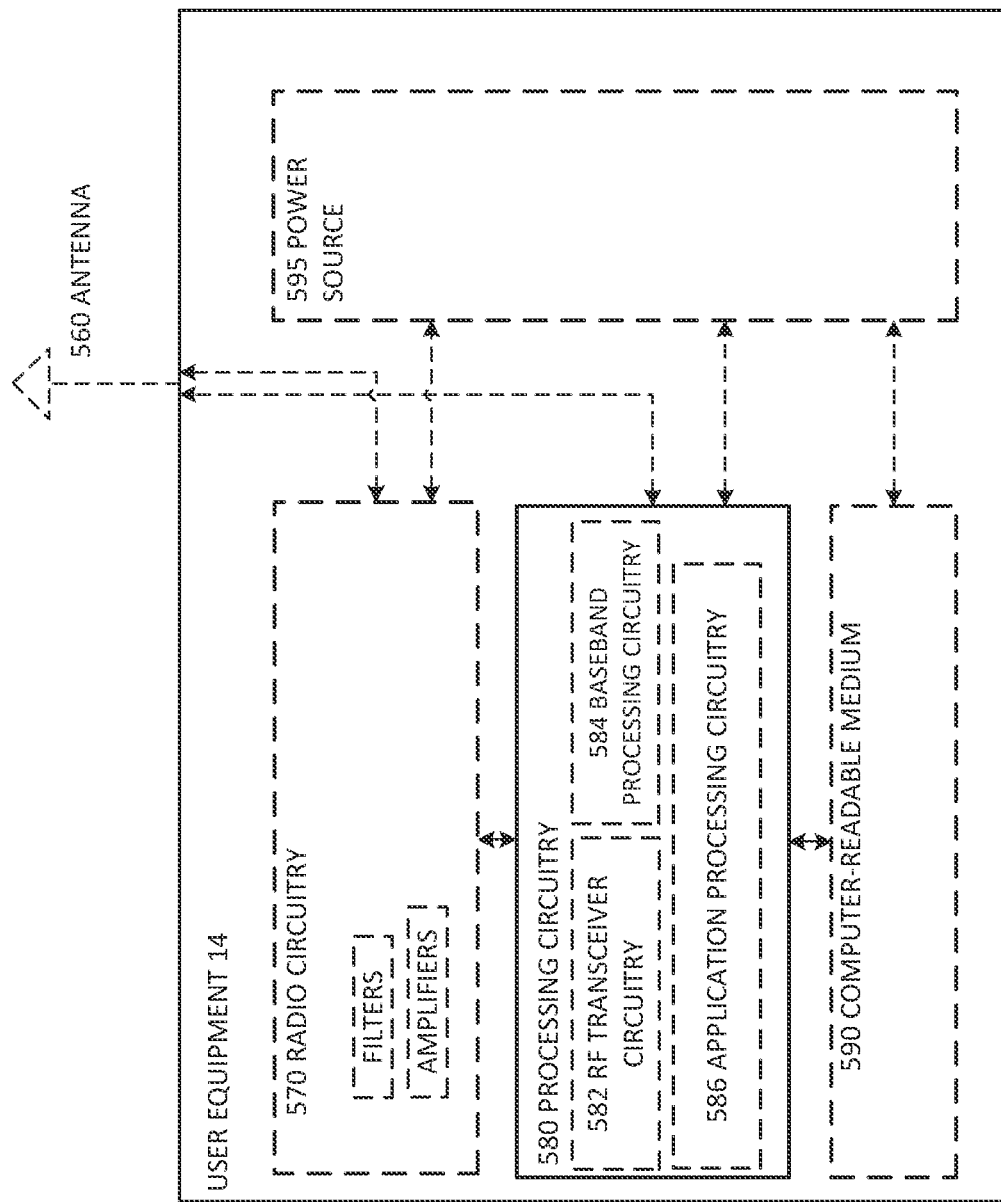

Additional details of a UE 14 are shown in relation to FIG. 15. As shown in FIG. 15, the example UE 14 includes an antenna 560, radio circuitry (e.g. radio front-end circuitry) 570, processing circuitry 580, and the UE 14 may also include a memory 590. The memory 590 may be separate from the processing circuitry 580 or an integral part of processing circuitry 580. Antenna 560 may include one or more antennas or antenna arrays, and is configured to send and/or receive wireless signals, and is connected to radio circuitry (e.g. radio front-end circuitry) 570. In certain alternative embodiments, UE 14 may not include antenna 560, and antenna 560 may instead be separate from UE 14 and be connectable to UE 14 through an interface or port.

The radio circuitry (e.g. radio front-end circuitry) 570 may comprise various filters and amplifiers, is connected to antenna 560 and processing circuitry 580, and is configured to condition signals communicated between antenna 560 and processing circuitry 580. In certain alternative embodiments, UE 14 may not include radio circuitry (e.g. radio front-end circuitry) 570, and processing circuitry 580 may instead be connected to antenna 560 without front-end circuitry 570.

Processing circuitry 580 may include one or more of radio frequency (RF) transceiver circuitry 582, baseband processing circuitry 584, and application processing circuitry 586. In some embodiments, the RF transceiver circuitry 582, baseband processing circuitry 584, and application processing circuitry 586 may be on separate chipsets. In alternative embodiments, part or all of the baseband processing circuitry 584 and application processing circuitry 586 may be combined into one chipset, and the RF transceiver circuitry 582 may be on a separate chipset. In still alternative embodiments, part or all of the RF transceiver circuitry 582 and baseband processing circuitry 584 may be on the same chipset, and the application processing circuitry 586 may be on a separate chipset. In yet other alternative embodiments, part or all of the RF transceiver circuitry 582, baseband processing circuitry 584, and application processing circuitry 586 may be combined in the same chipset. Processing circuitry 580 may include, for example, one or more central processing units (CPUs), one or more microprocessors, one or more application specific integrated circuits (ASICs), and/or one or more field programmable gate arrays (FPGAs).

The UE 14 may include a power source 595. The power source 595 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 570, processing circuitry 580, and/or memory 590. The power source 595, battery, power supply circuitry, and/or power management circuitry are configured to supply user equipment 14, including processing circuitry 580, with power for performing the functionality described herein.

Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Other embodiments of the present disclosure may additionally or alternatively include one or more aspects of the embodiments enumerated below, and/or any compatible combination thereof and/or any individual feature (or combination features) discussed above. Further, the present invention may be carried out in other ways than those specifically set forth herein without departing from essential characteristics thereof. The present embodiments (including those detailed above and enumerated below) are to be considered in all respects as illustrative and not restrictive. All changes coming within the meaning and equivalency range of the present embodiments are intended to be embraced unless otherwise specified. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A method, performed by a user equipment (UE) in a serving cell for performing link measurements in a wireless communication network, the method comprising:
   determining a snapshot value of a serving link signal received quality while the UE is permitted to refrain from performing neighbor link measurements;
   detecting, while the UE is permitted to refrain from performing neighbor link measurements, that signal received quality of the serving link has dropped by at least a threshold amount below the snapshot value and, in response, performing a neighbor link measurement.

2. The method of claim 1, further comprising updating the snapshot value with a current serving link signal received quality in response to the serving link signal received quality being raised above the snapshot value while the UE is permitted to refrain from performing neighbor link measurements.

3. The method of claim 1, wherein determining the snapshot value is responsive to selecting or reselecting the serving cell to provide the serving link.

4. The method of claim 1, wherein determining the snapshot value is responsive to detecting that the UE is permitted to refrain from performing neighbor link measurements.

5. The method of claim 4, wherein detecting that the UE is permitted to refrain from performing neighbor link measurements comprises detecting that the serving link signal received quality is above a further threshold.

6. The method of claim 4, further comprising receiving signaling specifying one or more values of a condition under which the UE is permitted to refrain from performing neighbor link measurements, wherein detecting that the UE is permitted to refrain from performing neighbor link measurements comprises using the one or more values to detect that the condition is true.

7. The method of claim 6, wherein the signaling specifying the one or more values comprises:
   broadcast signaling specifying a non-UE-specific base value of the condition; and
   UE-specific signaling specifying a UE-specific modifier to the base value.

8. The method of claim 1, further comprising refraining from performing neighbor link measurements for more than a threshold period, and in response, performing a further neighbor link measurement.

9. The method of claim 1, further comprising receiving signaling indicating that the UE is permitted to refrain from performing neighbor link measurements for no longer than a given duration.

10. A user equipment (UE) for performing link measurements in a wireless communication network, the UE comprising:
    processing circuitry and a memory, the memory containing instructions executable by the processing circuitry whereby the UE is configured to:
    determine a snapshot value of a serving link signal received quality while the UE is permitted to refrain from performing neighbor link measurements;
    detect, while the UE is permitted to refrain from performing neighbor link measurements, that signal received quality of a serving link has dropped by at least a threshold amount below the snapshot value and, in response, perform a neighbor link measurement.

11. The UE of claim 10, wherein the UE is further configured by the instructions to update the snapshot value with a current serving link signal received quality in response to the serving link signal received quality being raised above the snapshot value while the UE is permitted to refrain from performing neighbor link measurements.

12. The UE of claim 10, wherein the UE is configured to determine the snapshot value responsive to selecting or reselecting the serving cell to provide the serving link.

13. The UE of claim 10, wherein the UE is configured to determine the snapshot value responsive to detecting that the UE is permitted to refrain from performing neighbor link measurements.

14. The UE of claim 13, wherein to detect that the UE is permitted to refrain from performing neighbor link measurements, the UE is configured to detect that the serving link signal received quality is above a further threshold.

15. The UE of claim 13, wherein the instructions further configure the UE to receiving signaling specifying one or more values of a condition under which the UE is permitted to refrain from performing neighbor link measurements, wherein to detect that the UE is permitted to refrain from performing neighbor link measurements, the UE is configured to use the one or more values to detect that the condition is true.

16. The UE of claim 15, wherein the signaling specifying the one or more values comprises:
    broadcast signaling specifying a non-UE-specific base value of the condition; and
    UE-specific signaling specifying a UE-specific modifier to the base value.

17. The UE of claim 10, wherein the instructions further configure the UE to performing a further neighbor link measurement in response to refraining from performing neighbor link measurements for more than a threshold period.

18. The UE of claim 10, wherein the instructions further configure the UE to receive signaling indicating that the UE is permitted to refrain from performing neighbor link measurements for no longer than a given duration.

19. A non-transitory computer readable medium storing a computer program product for controlling a programmable user equipment (UE) in a wireless communication network, the computer program product comprising software instructions that, when run on the programmable UE, cause the programmable UE to:
    determine a snapshot value of a serving link signal received quality while the UE is permitted to refrain from performing neighbor link measurements;
    detect, while the UE is permitted to refrain from performing neighbor link measurements, that signal received quality of a serving link has dropped by at least a threshold amount below the snapshot value and, in response, perform a neighbor link measurement.

* * * * *

UNITED STATES PATENT AND TRADEMARK OFFICE
CERTIFICATE OF CORRECTION

| | | |
|---|---|---|
| PATENT NO. | : 11,570,671 B2 | Page 1 of 1 |
| APPLICATION NO. | : 17/225451 | |
| DATED | : January 31, 2023 | |
| INVENTOR(S) | : Nader et al. | |

It is certified that error appears in the above-identified patent and that said Letters Patent is hereby corrected as shown below:

On the Title Page

On Page 2, in Item (56), under "OTHER PUBLICATIONS", in Column 2, Line 9, delete "May 1, 2017," and insert -- Mar. 1, 2017, --, therefor.

In the Specification

In Column 1, Line 8, delete "2019," and insert -- 2019, now U.S. Pat. No. 11,006,334, --, therefor.

In Column 5, Line 52, delete "km2" and insert -- $km^2$ --, therefor.

In Column 6, Line 5, delete "Full" and insert -- Frequency --, therefor.

In Column 7, Line 56, delete "taken" and insert -- take --, therefor.

In Column 9, Line 52, delete "SintraSearchP," and insert -- SIntraSearchP, --, therefor.

In Column 9, Line 59, delete "then a" and insert -- than a --, therefor.

In Column 10, Line 41, delete "FIG. 5," and insert -- FIG. 5 --, therefor.

In Column 11, Line 67, delete "type" and insert -- type of --, therefor.

In Column 12, Line 12, delete "equipped" and insert -- equipment --, therefor.

In Column 12, Line 18, delete "IOT" and insert -- IoT --, therefor.

Signed and Sealed this
Fourth Day of July, 2023

Katherine Kelly Vidal
*Director of the United States Patent and Trademark Office*